June 24, 1924.
I. TSUCHIYA
CLAMP FOR THE OVERLAPPING TINES OF BAMBOO RAKES
Filed Dec. 21, 1922
1,499,086
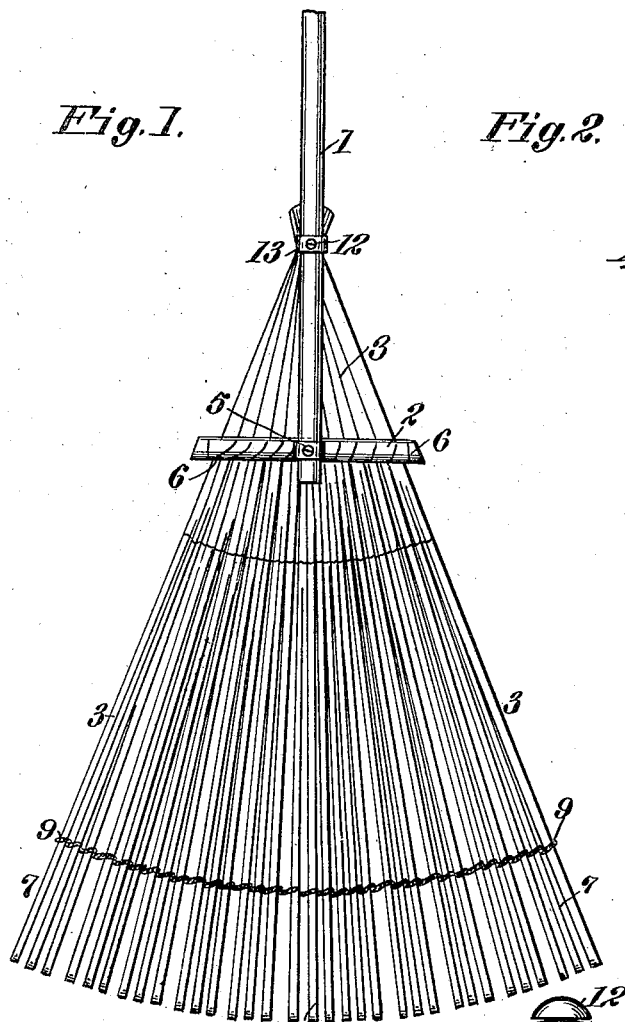
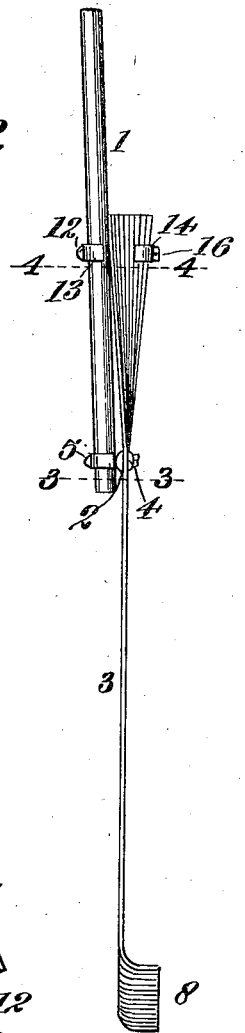
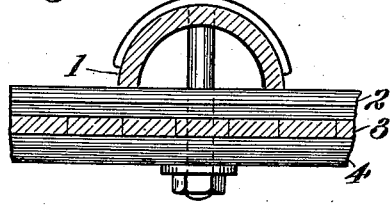
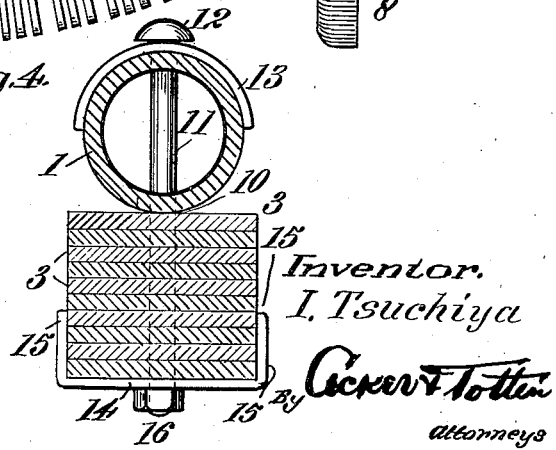
Inventor.
I. Tsuchiya Patented June 24, 1924.

1,499,086

UNITED STATES PATENT OFFICE.

INOSUKE TSUCHIYA, OF SAN FRANCISCO, CALIFORNIA.

CLAMP FOR THE OVERLAPPING TINES OF BAMBOO RAKES.

Application filed December 21, 1922. Serial No. 608,236.

*To all whom it may concern:*

Be it known that I, INOSUKE TSUCHIYA, a subject of the Emperor of Japan, residing at the city and county of San Francisco and State of California, have invented certain new and useful Improvements in Clamps for the Overlapping Tines of Bamboo Rakes, of which the following is a specification.

Heretofore in the manufacture of bamboo lawn rakes, it has been the practice in uniting the rear ends of the tine forming strips to the handle to wrap a wire around the butt ends of the strips at their point of radiation from the handle and around the handle to attempt a secure connection. This connection has been found faulty in that when in use the tines often split and when drawn over the lawn during the raking operation slip longitudinally from their assembled position.

The present invention relates to a simple form of clamping mechanism for uniting the butt ends of the tine forming members to the handle and enabling the members and handle to be tightly clamped together thus precluding the longitudinal movement of the tines from the handle during the raking operation. A further object is to provide a type of clamp adapted to partly embrace the round bamboo handle and preclude the same from splitting when the rake is not in use.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

In the drawings illustrating the preferred embodiment of my invention,

Figure 1 is a view in rear elevation of my invention for use on a bamboo rake of the well known type.

Fig. 2 is a view in side elevation.

Fig. 3 is a sectional view taken on line 3—3 of Fig. 2.

Fig. 4 is a sectional view taken on line 4—4 of Fig. 2.

In the drawings, wherein like characters of reference designate corresponding parts throughout the several views, 1 indicates the conventional bamboo handle of a rake mounting at its end the well known type of cross head, 2. Disposed radially from the end of the bamboo handle 1 are the relatively flat bamboo strips 3 which extend in fan-like formation from a point beneath the end of the handle 1 outwardly under the cross head 2. The strips 3 rest against the under side of the cross head 2 and are maintained in contact with the under side of said cross head by a bottom clamping head member 4. A bolt 5 passes through the members 2 and 4 and retains the tine forming members therebetween. If desirable, a wire or other flexible retaining member 6 is wound around the members 2 and 4 to retain them together at their point of projection on either side of the end of the handle 1. At their outer or free ends, each tine forming member 3 is split longitudinally to form the spaced tines 7 and the ends of these tines are curved or bent downwardly as at 8 to form rack teeth of the conventional type. The tines 7 are maintained in spaced cooperative relation by the interlacing of a flexible cord or rope 9 about the same transversely across the rake at a point removed inwardly from the teeth 8. To this point the rake is of the conventional well known structure and my invention consists in the manner of anchoring the rear ends of the members 3 which is as follows.

At their point of intersection in superimposed overlapping relation the members 3 are drilled as at 10 to provide an aligned hole therethrough and through the handle 1. Through this hole 10 is inserted a bolt 11 having a head 12 and beneath the head and the handle 1 is positioned a curved clamping plate 13 which is adapted to embrace about one-half of the handle 1. Positioned over the tines at their point of intersection is a second clamping plate 14 substantially rectangular in side elevation, the main body thereof adapted to extend transversely across the exterior tine forming member 3 and the parallel bent ends 15 are adapted to project inwardly over the opposing sides of certain of the outer tine forming members as in Fig. 4. A nut 16 is fitted onto the end of the bolt 11 and when adjusted is adapted to draw the clamping members 13 and 14 toward each other and tightly clamp the tines 3 and rake handle 1 together. This clamping construction has been found to prevent the longitudinal slipping of the tine forming members relative to the cross head 1 and has also been found to provide a construction enabling the quick assembly of the rake forming tines on the handle.

Having thus described my invention what I claim as new and desire to secure by Letters Patent, is:

Means for anchoring the tines of bamboo rakes, wherein a rake includes a bamboo handle of circular section, a cross bar mounted on one end of the handle, a plurality of bamboo rake forming tines arranged in fan-shaped relation and secured in the central portion to the cross bar, the ends being extended into overlapping relation with respect to each other and the handle at a predetermined point thereon: comprising a U-shaped holding member adapted to extend across the outer tine and positioned with the legs embracing the edges of a plurality of the overlapped tines, and a securing bolt extending through the holding member, aligned openings in the overlapped tines, and the handle, having means cooperating with said bolt for locking the tines to the handle, whereby the tines are prevented by said U-shaped member from splitting and separating from the securing bolt.

In testimony whereof I have signed my name to this specification.

INOSUKE TSUCHIYA.